UNITED STATES PATENT OFFICE.

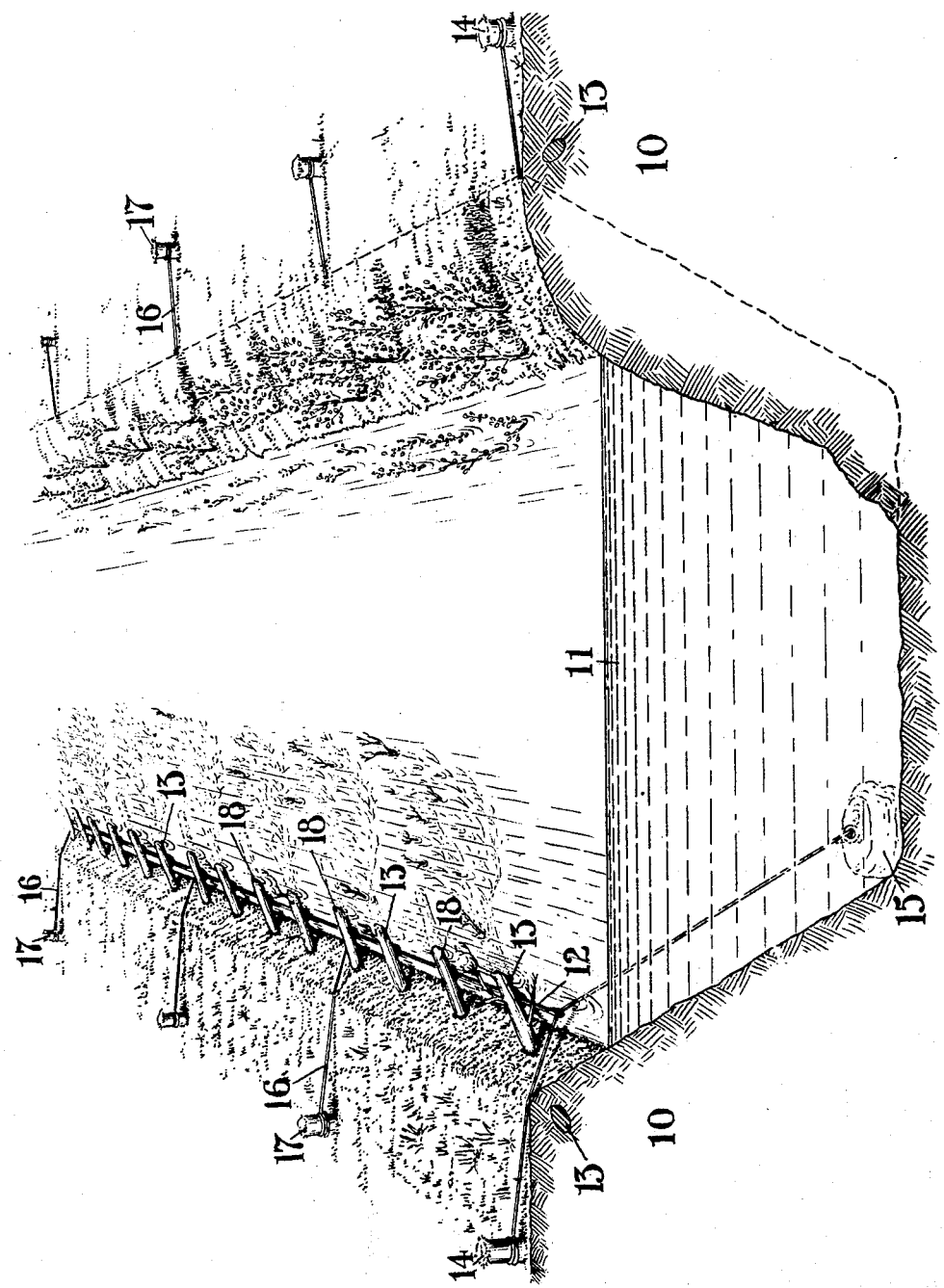

ARNO FREDERICK SMISER, OF ELBA, NEBRASKA.

METHOD OF PROTECTING RIVER-BANKS.

SPECIFICATION forming part of Letters Patent No. 717,039, dated December 30, 1902.

Application filed July 25, 1902. Serial No. 116,988. (No model.)

*To all whom it may concern:*

Be it known that I, ARNO FREDERICK SMISER, a citizen of the United States, residing at Elba, in the county of Howard and State of Nebraska, have invented a new and useful Method of Protecting River-Banks, of which the following is a specification.

This invention relates to improvements in methods for protecting the banks of rivers and running streams to prevent them from being cut away by the action of the water, and which may also be employed in building jetties, wing-dams, and similar structures, and has for its object the employment of a simple easily-constructed means whereby the sediment in the water is caused to form, in conjunction with growing trees or similar obstructions, a supplemental bank to the river or stream which will effectually resist the action of the water.

The invention consists in the employment of a plurality of trees, preferably of the willow family or similar trees which will grow spontaneously, disposed upon the bank of the stream with their butts upon the bank and their tops in the water and pointing downstream, the butts of the trees connected by wires or cables suitably anchored to the bank and to the bottom of the stream and further secured at suitable intervals by spaced stakes, so that the flowing water is obstructed, to cause the silt and other floating material to be caught by the tree branches and permanently engaged and eventually build up a solid bank commingled with the tree branches, the roots of the trees in growing forming a binding means to retain the collected matter in position to effectually resist the action of the running water.

In the drawing illustrative of the invention the figure is a perspective view of a section of a stream with the invention applied to the opposite banks, the structure on the left-hand bank illustrating the first steps in the method of applying the invention and the structure on the right-hand bank illustrating the method completed.

The improvement may be applied to any river or other running stream either for the purpose of protecting the banks or for building jetties, wing-dams, or similar structures, and for the purpose of illustration the improvement is shown applied to the banks (represented at 10) with the usual slope, the water being represented at 11.

The improvement consists in arranging upon the banks of the stream a plurality of tree-trunks, with the branches in the water and pointing downstream, and suitably supporting the trees in position until a sufficient quantity of sediment and silt has been engaged by the tree-tops to render other anchorage or support unnecessary. The temporary anchoring means consists of a wire or small cable 12, suitably coupled to the tree-trunks, (represented at 13.) The cable will be suitably anchored to the bank, as by stakes 14, and also connected to stone or other anchors 15 in the bed of the stream. Additional anchor-wires 16 will be arranged at suitable intervals and connected to stakes 17 upon the bank, these anchoring means being placed at sufficiently short intervals to support the connecting-wire and prevent the current from carrying away the trees. The butts of the trees will be embedded in the banks, so that they will grow and cause the branches to retain their strength, as well as to increase in size and number, and thereby offer an increased surface to the sediment and silt. Additional supporting-stakes 18 will be driven into the bank at suitable intervals and connected to the cable 12. By this means the spaced tree-trunks are firmly and securely supported in place and form means to check the flow of the water and permit the silt and sediment to be engaged thereby to cause the interstices between the branches and between the tree-trunks and stakes and around the cable and anchor wires to be filled and eventually to form a solid bank of the sediment intermingled with the branches of the trees and the tree-trunks and stakes, the growing trees forming a binding means which will form an impregnable mass of material which will effectually resist the action of the running water. Eventually the bank will be built out, as indicated at the right in Fig. 1, and completely covering the projecting trees, the latter growing upward through the bank, as will be obvious. The anchor-cables 12, together with the anchor-wires, will become non-effective after the sediment has completely covered the tree-trunks and their tops, but will effectually support the trees in position until the sediment has formed a permanent support thereto.

The sizes of the trees employed may be varied according to circumstances and may be placed at such distances apart as the sizes of the streams and the strength of the current may require. Streams having a strong current and comparatively deep in the channel may require larger trees and arranged at more frequent intervals and provided with stronger supporting cables, guys, and anchors than streams comparatively shallow and having a sluggish current; but it will be obvious that the improvement may be readily adapted to the varying conditions of the streams, and I do not wish to be limited to any specific sizes of trees or strength of supporting-cables, or to any specific number of trees, or to any specific arrangement of anchor and guy cables, or to any specific arrangement of the supporting-stakes, as their relative arrangement and location may be varied as required.

The trees employed will preferably be of the willow family or other trees which will grow spontaneously when the butts are inserted into the ground; but trees of any species may be employed if the above species cannot be obtained. The spontaneous growing of the trees is an advantage in connection with the operations of the improved method herein described; but this feature is not an absolute necessity, as the improvement is practicable under certain circumstances in connection with non-growing trees.

In practice it has been found that trees placed at about two and one-half feet apart secure the best results, and when thus arranged the anchor-posts 17 should be about ten rods apart and with the stakes 18 between every other one of the trees; but I do not wish to be limited in any manner to this specific arrangement, as the proportions may be modified, as above noted, to suit circumstances.

The cables 12 may be secured to the trees by staples or other suitable holding means.

When convenient, the anchor-guys may be attached to growing trees upon the banks of the stream instead of to the stakes 17.

In applying the invention the felled trees are placed in position with the butt-ends upon the bank and the branches in the water and inclining downstream and secured in that position by the holding-cables, anchors, and guy-cables, as above described. The continued erosion of the banks by the flowing water will soon cause a quantity of the earth to cave in and cover the butt-ends of the trees, and if the trees employed are of the willow family or of a species that will grow spontaneously they will soon take root and continue to grow, and eventually form a complete line of growing trees projecting from the bank and inclining downstream, with the branches in position to engage the floating silt and sediment, as above described. The supplemental bank is thus self-formed, and the device requires no further attention, as the action of the running water will eventually build the bank out into the stream and completely cover the trees and their branches and form an impervious protection.

This protecting means may be employed at points which are subject to erosion only, but may be employed to form a continuous bank upon one or both sides of the stream, or it may be employed to form jetties for the purpose of deepening the channels, or for other purposes where impervious banks, either in whole or in part, are required upon running streams.

Having thus described my invention, what I claim is—

1. The method herein shown and described for protecting the banks of running streams consisting in disposing a plurality of spaced trees upon the banks of the stream with the branches in the water in position to check the flow and engage the silt and other floating matter, and flexibly connecting the trees to the banks and to the bottom of the stream, substantially as described.

2. The method herein shown and described for protecting the banks of running streams consisting in disposing a plurality of trees upon the banks of the stream with the branches in the water in position to check the flow and engage the silt and other floating matter, and connecting the trees and maintaining them in position until the silt and floating matter has eventually formed a solid supplemental bank over the original bank of the stream, substantially as described.

3. The method herein shown and described for protecting the banks of running streams consisting in disposing a plurality of trees upon the banks of the stream with the branches in the water in position to check the flow and engage the silt and other floating matter, connecting the trees in series and suitably anchoring them to the banks, and intermediately supporting said trees.

4. The method herein shown and described for protecting the banks of running streams consisting in disposing a plurality of trees upon the banks of the stream with the branches in the water in position to check the flow and engage the silt and other floating matter, flexibly connecting the trees in series, and suitably anchoring the series to the bank at suitable intervals, substantially as described.

In testimony that I claim the foregoing as my own I have hereto affixed my signature in the presence of two witnesses.

ARNO FREDERICK SMISER.

Witnesses:
DEAN STATNAKER,
PETER JEPSON.